United States Patent [19]

Michaels

[11] Patent Number: 5,186,793
[45] Date of Patent: Feb. 16, 1993

[54] OXYGEN CONCENTRATOR UTILIZING ELECTROCHEMICAL CELL

[75] Inventor: Gregory A. Michaels, Seven Hills, Ohio

[73] Assignee: Invacare Corporation, Elyria, Ohio

[21] Appl. No.: 636,487

[22] Filed: Dec. 31, 1990

[51] Int. Cl.⁵ .......................... C25B 1/02; C25B 9/00
[52] U.S. Cl. .............................. 204/59 R; 204/242; 204/277; 204/278; 204/130; 55/2
[58] Field of Search ............... 204/242, 272, 432, 277, 204/278, 59 R, 410, 153.18, 153.16, 130; 55/2

[56] References Cited

U.S. PATENT DOCUMENTS

| | | | |
|---|---|---|---|
| Re. 28,792 | 4/1976 | Ruka et al. | 204/17 |
| 1,120,436 | 12/1914 | Bergfeld . | |
| 3,400,054 | 9/1968 | Ruka et al. | 204/1 |
| 3,410,783 | 11/1968 | Tomter | 204/266 |
| 3,888,749 | 6/1975 | Chong | 204/129 |
| 4,061,554 | 12/1977 | Chillier-Duchatel et al. | 204/129 |
| 4,089,938 | 5/1978 | Turner | 423/579 |
| 4,132,766 | 1/1979 | Erickson | 423/579 |
| 4,287,170 | 9/1981 | Erickson | 423/579 |
| 4,300,987 | 11/1981 | Tseung et al. | 204/129 |
| 4,340,578 | 7/1982 | Erickson | 423/579 |
| 4,341,847 | 7/1982 | Sammells | 429/27 |
| 4,377,460 | 3/1983 | Hirayama et al. | 204/195 |
| 4,391,690 | 7/1983 | Lin et al. | 204/412 |
| 4,395,468 | 7/1983 | Isenberg | 429/31 |
| 4,408,951 | 10/1983 | Ishii | 415/36 |
| 4,431,715 | 2/1984 | Isenberg | 429/30 |
| 4,475,994 | 10/1984 | Gagné et al. | 204/129 |
| 4,490,444 | 12/1984 | Isenberg | 429/31 |
| 4,515,874 | 5/1985 | Steinleitner | 429/104 |
| 4,526,775 | 7/1985 | Cassano | 423/579 |
| 4,529,577 | 7/1985 | Chen et al. | 423/351 |
| 4,565,685 | 1/1986 | Gassano | 423/579 |
| 4,664,987 | 5/1987 | Isenberg | 429/31 |
| 4,738,760 | 4/1988 | Marianowski et al. | 204/130 |
| 4,808,491 | 2/1989 | Reichner | 429/13 |
| 4,812,329 | 3/1989 | Isenberg | 427/115 |
| 4,876,163 | 10/1989 | Reichner | 429/30 |
| 4,888,254 | 12/1989 | Reichner | 429/31 |
| 4,908,113 | 3/1990 | Marianowski et al. | 204/243 R |

Primary Examiner—Donald R. Valentine
Assistant Examiner—Kathryn Gorgos
Attorney, Agent, or Firm—Fay, Sharpe, Beall, Fagan, Minnich & McKee

[57] ABSTRACT

An oxygen concentration system for producing oxygen from air comprises an electrochemical oxygen generator mounted within an inner housing. The generator has an outer surface and is adapted to extract oxygen from air by means of an electrochemical reaction. The oxygen generator fits within an inner housing having the form of an annulus. The inner housing is insulated and is spaced from the outer surface of the oxygen generator to create a first passageway. Air in the first passageway is heated by the generator and rises upwardly out of the passageway by means of convection.

56 Claims, 4 Drawing Sheets

OXYGEN CONCENTRATOR UTILIZING ELECTROCHEMICAL CELL

BACKGROUND OF THE INVENTION

1. Field of Invention

This invention pertains to the art of methods and devices capable of separating oxygen from air, and more particularly to the separation of oxygen from air to supplement an otherwise deficient condition, such as when a patient in a hospital is unable to breathe properly or where the ambient atmosphere is deficient in oxygen, such as at high altitudes.

2. Description of Related Art

In hospitals, nursing homes, private homes, and other locations in which sick or elderly patients are cared for, or in aircraft travelling at high altitudes, a source of pure or high-concentration oxygen is often necessary to assist in the breathing process. Because sick or elderly patients are sometimes unable to draw enough air into their lungs, the patient's breathing process is supplemented by the addition of pure oxygen. Because air is only 21% oxygen, the provision of pure or nearly pure oxygen greatly reduces the effort required on the part of the patient to acquire the requisite oxygen for life.

In the past, such oxygen has been supplemented through the use of pressurized tanks and/or liquid oxygen systems. While the tanks have been suitable for their intended purpose, they require pick-up, refilling, and delivery when the initial supply is depleted. In some environments, they also pose a fire hazard.

Some devices have been developed to separate, concentrate, or generate oxygen from ambient air. Many of these devices are based on nitrogen adsorption systems which concentrate oxygen from air to deliver a maximum of 95% $O_2$ by removing nitrogen from ambient air. U.S. Pat. No. 4,449,990 describes one such apparatus. Such devices require a parasitical purging of one tank by pure oxygen from another tank in order to maintain effectiveness. Further, moisture can be damaging to the nitrogen adsorption material.

To overcome the foregoing deficiencies in the art, applicant saw a need for a light-weight, quiet, inexpensive device which could generate pure oxygen from ambient air in quantities small enough to be cost effective for single patient use.

The present invention contemplates a new and improved oxygen generating system which overcomes many of the foregoing difficulties and others while providing better and more advantageous overall results.

SUMMARY OF THE INVENTION

In accordance with the present invention, a new and improved oxygen concentration system is provided which utilizes an electrochemical process.

More particularly, in accordance with the invention, the oxygen concentration system includes an electrochemical oxygen generator which has an outer surface and is adapted to extract oxygen from the air by means of an electrochemical reaction. An inner housing of the system has inner, outer, base, and top surfaces. The generator is mounted within the inner housing so that a first passageway is created between the inner surface of the inner housing and the outer surface of the generator. The inner housing has a first inlet near the base surface of the inner housing and a first outlet near the top surface of the inner housing. The first passageway created between the inner surface of the inner housing and the outer surface of the generator is operatively adapted for passing air entering the first inlet to the first outlet by means of convection.

According to another aspect of the invention, the inner housing is mounted within an outer housing. The outer housing has an inner, an outer, a base, and a top surface. The inner housing is mounted within the outer housing so that a second passageway is created between the inner surface of the outer housing and the outer surface of the inner housing.

According to another aspect of the invention, a transition passageway having a third inlet and a third outlet connects the first passageway and the second passageway, so that air exiting the second passageway enters the transition passageway and eventually enters the first passageway.

According to another aspect of the invention, a reflective shield is mounted above and below the inner housing and is suitable for reflecting infrared radiation back into the inner housing.

According to another aspect of the invention, a cap is attached to the top of the outer housing and is effective to create a first mixing zone within the cap. The mixing zone receives cooler air entering the cap as well as warmer air exiting the first passageway and mixes the air, allowing transfer of heat from the warm air to the cold.

According to another aspect of the invention, the generator is capable of generating oxygen from air upon the application of an electrical current. The generator comprises a plurality of adjacent electrochemical cells electrically connected in series, although other embodiments can be connected in parallel. Each cell contains an inner, porous oxygen electrode. A dense solid oxide electrolyte capable of transporting oxygen ions is partly disposed on top of the inner electrode and partly disposed between the inner electrodes of the adjacent cells. An outer, porous air electrode is disposed on top of the electrolyte. Separate, dense, electronically conductive segments of inner connection material are disposed between adjacent cells. The inner connection electronically and physically connects the outer air electrode from one cell to the inner oxygen electrode from an adjacent cell. The oxygen generator has gas impermeable, dense, contacting segments of electrolyte and inner connection material between inner electrodes of adjacent cells.

According to another aspect of the invention, a method of moving air past a cylindrical electrochemical oxygen generator comprises heating the air in a first air passageway formed between the generator and a first housing, introducing cooler air above the air in the first air passageway, and moving the air in the first air passageway by means of convection.

According to another aspect of the invention, a method of moving air past a cylindrical electrochemical oxygen generator comprises heating the air in the first air passageway, introducing cooler air into a mixing zone in a circular fashion to create a vortex, the vortex creating a zone of low pressure above the first air passageway, directing the cooler air entering the mixing zone downwardly into a second air passageway, the cooler air effective to displace warmer air at the base of the first air passageway.

One advantage of the present invention is its light weight. It lacks heavy tanks needing to be refilled as well as the extra weight associated with nitrogen adsorption devices.

Another advantage is the preheating of the air before it interacts with the oxygen generator. As discussed later, advantages are obtained by preheating incoming ambient air.

Another advantage is the elimination of the need for heavy insulation, such as is commonly used in other solid electrolyte oxygen generation systems. The heavy insulation such as is commonly used in other high temperature systems because of the high temperatures associated with the oxygen generation process. The present invention avoids the need for such insulation by mixing warmer outgoing air with large amounts of cooler ambient air.

Another advantage is that the device is made of inexpensive materials, such as sheet metal.

Another advantage of the current invention is the quiet way in which it operates. The preferred embodiment features two small blowers, although it is believed the invention can successfully be practiced with no moving parts at all.

Another advantage of the current invention is the pure oxygen obtainable from the process. Rather than concentrated oxygen, the output of applicant's invention is essentially pure oxygen.

Another advantage of the present invention is the energy efficient way in which it operates, drawing on natural phenomena such as convection to move air past the electrochemical cell.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts, a preferred embodiment of which will be described in detail in the specification and illustrated in the accompanying drawings, which form a part hereof, and wherein.

DESCRIPTION OF THE PREFERRED EMBODIMENT

Figure 4:
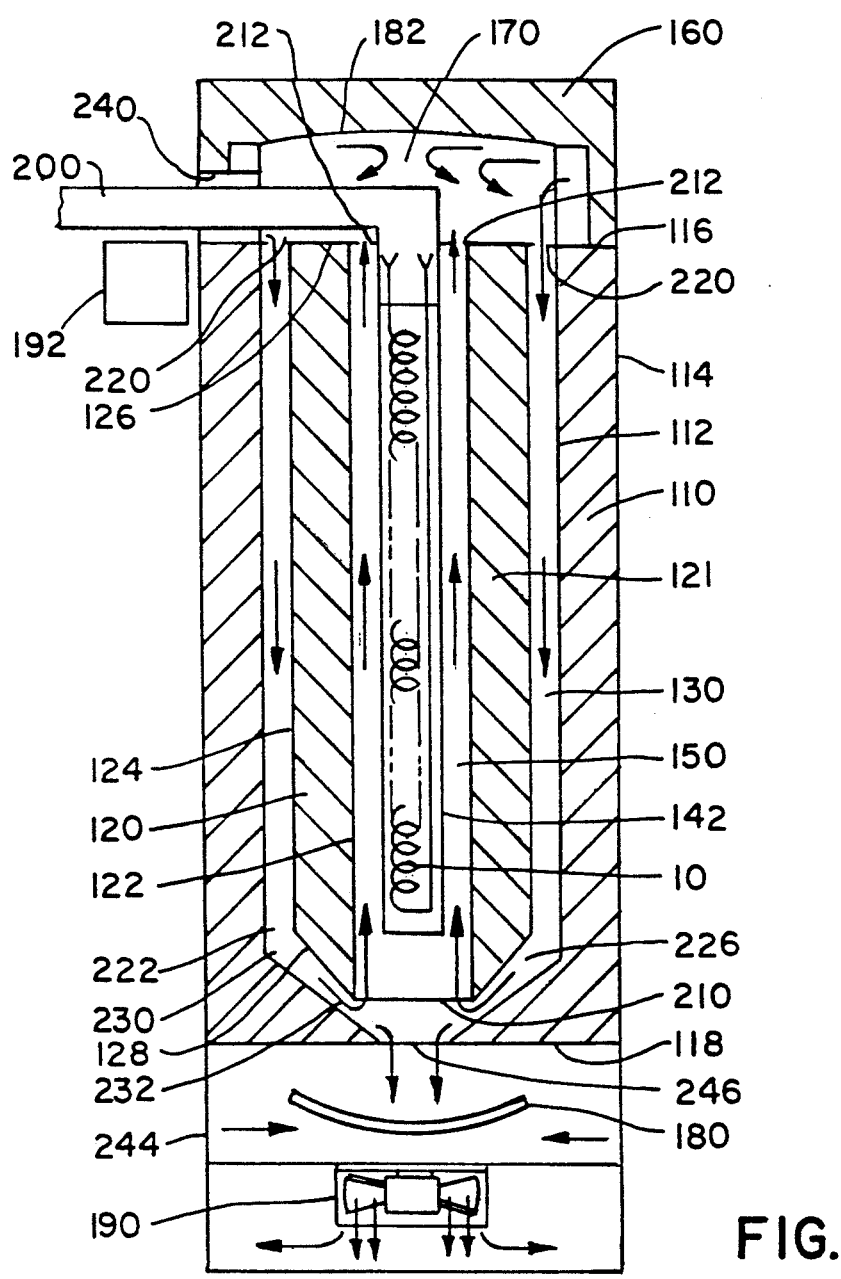
FIG. 4 is a front elevational cross-sectional view of an oxygen generation system according to the present invention; and, FIG. 5 is a front, elevational view in partial cross-section according to one embodiment of the present invention.

Referring now to the drawings, wherein the showings are for purposes of illustrating a preferred embodiment of the invention only, and not for purposes of limiting same, FIG. 4 shows a front elevational cross-sectional view of the invention.

An outer housing 110 has an inner surface 112, an outer surface 114, a top surface 116, and a base surface 118.

Similarly, an inner housing 120 has an inner surface 122, an outer surface 124, a top surface 126, and a base surface 128.

In the preferred embodiment, both the outer housing 110 and the inner housing 120 are cylindrical, taking the form of an annulus. The inner housing 120 is mounted concentrically within the outer housing 110.

Mounted concentrically within the inner housing 120 is an electrochemical oxygen generator 10. The operation of this oxygen generator will be discussed in more detail later in this specification. A first passageway 150 is formed between the inner surface 122 of the inner housing 120 and the outer surface 142 of the generator 10. A second air passageway 130 is formed between the outer surface 124 of the inner housing 120 and the inner surface 112 of the outer housing 110.

Figure 3:
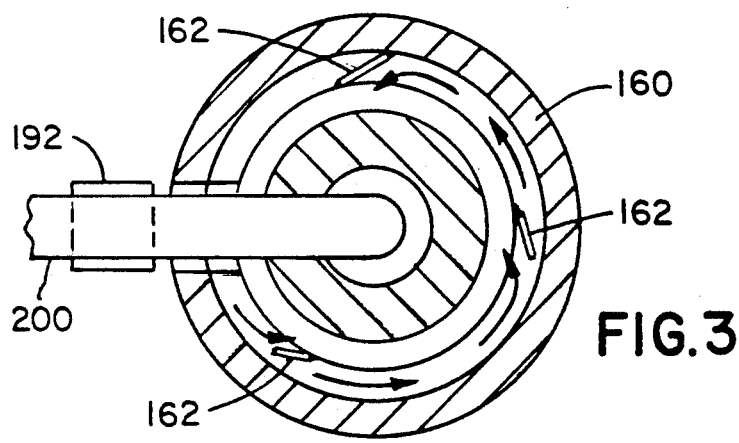
FIG. 3 is a top cross-sectional view of an oxygen generation system according to the present invention.

A cap 160 is attached to the top surface 116 of the outer housing 110. The cap 160 forms a mixing zone 170 above the first and second passageways 150, 130. With reference to FIG. 3, the cap 160 has a plurality of fins 162 mounted to its inner periphery. The operation of these fins 162 will be described below.

With reference to FIG. 4, infrared shields 180, 182 are mounted above and below the first and second passageways 150, 130 and are effective to reflect infrared radiation emanating from the generator 10 back into the generation system. In the preferred embodiment, these shields are parabolic. The interior surface of the cap 160 is coated with a reflective material and is curved to form reflective shield 182. The cap 160 is also insulated to retain heat.

A first and second blower 190, 192 are utilized in the preferred embodiment of the invention and are schematically shown in FIG. 4. The purpose and operation of these blowers will be discussed below.

Oxygen generated by the generation system is removed from the device via discharge tube 200. Because the oxygen is generated at a pressure above atmospheric pressure, the oxygen flows out of discharge tube 200 without the need for a blower or pump.

The operation of the device will now be explained. One of the primary objectives of the device is to provide a steady stream of air to the generator 10 in such quantities so as to insure a sufficient production of oxygen from the generator 10. Also, this air must be supplied with a minimum amount of noise generated or energy expended. Preferably, the air is preheated before it reaches the generator 10. The device utilizes several air passageways, with their associated inlets and outlets, to accomplish these objectives. For purposes of illustration, the outlets will be designated as follows. A first inlet 210 of the first passageway 150 is located near the base surface 128 of the inner housing 120. Correspondingly, a first outlet 212 of the first passageway 150 is located near the top surface 126 of the inner housing 120.

A second inlet 220 of the second passageway 130 is located near the top surface 116 of the outer housing 110. Correspondingly, a second outlet 222 of the second passageway 130 is located near the base surface 118 of the outer housing 110. In the preferred embodiment, the lower portions of the second passageway 130 are angled inwardly so as to reduce losses due to friction within the second passageway 130. In this embodiment, by angling the lower portions of the second passageway 130 in this way, an additional transition passageway 226 is formed. In this embodiment, the transition passageway 226 begins with a third inlet 230 and terminates with a third outlet 232. The third inlet 230 of the transition passageway 226 cooperates with the second outlet 222 of the second passageway 130 and the third outlet 232 of the transition passageway 226 cooperates with the first inlet 210 of the first passageway 150 so that air exiting the second passageway 130 enters the transition passageway 226. A fourth inlet 240 is located in the cap 160.

Air flow under operating conditions is as follows. With continuing reference to FIGS. 3 and 4, the second blower 192 introduces ambient air into the fourth inlet 240 of the cap 160. The air is introduced tangentially to contribute to a circular, swirling condition in the mixing zone 170 inside the cap 160. Fins 162 contribute to this circular air flow. The direction of air flow is shown in FIG. 3.

Because the generator 10 operates at high temperature, air in the first passageway 150 is warmer than air in other places throughout the device. As such, air exiting the first outlet 212 tends to be warmer than air entering the mixing zone 170 at the fourth inlet 240. The cooler air entering the mixing zone 170 at the fourth inlet 240 tends to drop downwardly through the second inlet 220 of the second passageway 130. The air travels downwardly through the second passageway 130, out the second outlet 222, and into the transition passageway 226. After exiting the transition passageway 226, the air tends to be drawn into first inlet 210 of the first passageway 150. While in the first passageway 150, the air travels longitudinally along the outer surface 142 of the generator 10. While the air travels along the longitudinal length of the generator 10, some air is processed by the generator via an electrochemical reaction which will be discussed in more detail later in the specification. All of the air is heated while in the first passageway 150 and its temperature rises significantly. Above the first passageway 150 in the mixing zone 170, a vortex is formed due to the swirling effect of second blower 192, fins 162, and the tangential direction of the air flow. The center of the vortex is a point of low pressure, due to the thermodynamic and fluid flow aspects of a vortex. This point of low pressure is centered over the first outlet 212 of the first passageway 150. As such, the area of low pressure tends to pull air from within the first passageway 150 to the mixing zone 170.

This vortex is one of two non-mechanical mechanisms which help air circulate within the system. A second is thermal convection currents. Pressure is created by cooler, dense air in the second passageway 130 accumulating near the first inlet 210 of the first passageway 150. This cooler air exiting the transition passageway 226 tends to accumulate at the first inlet 210 of the first passageway 150. This cooler air, being more dense than the warmer air, tends to fall downwardly within the second passageway 130 and displace warmer air near the first inlet 210. This displaced warmer air rises, bringing it into closer association with the generator 10. This closer association raises the temperature of the air even higher, causing it to become less dense and to rise even faster. The warmer air rises due to the principle of convection. By these mechanisms, air is circulated through the device with a minimum of electrical power expended and noise generated.

The air flow generated by the second blower 192 can be adjusted during start up to assist in heating up the device to operating temperatures. At relatively low air flow rates, the second blower 192 is effective to introduce ambient air into the fourth inlet 240 of the cap 160. The air is introduced tangentially and is directed by the fins 162 to the second inlet 220 of the second passageway 130. As discussed above, the air in the second passageway tends to drop downwardly due to its relatively high density to the warmer air rising upwardly in the first passageway 150. At this air flow rate supplied by the second blower 192, air in the second passageway 130 drops downwardly while air in the first passageway 150 travels upwardly.

If the air flow rate of the second blower 192 is adjusted upwardly, a condition results where the positive pressure within the cap 160 generated by the blower 192 is approximately equal to the convection forces present in the first passageway 150. At this condition, air flow within the first passageway 150 stops and the temperature of the generator 10 rises. This air flow rate by the second blower 192 can be useful in bringing the device up to operating temperatures quickly.

If the airflow rate of the second blower 192 is increased still further, the positive pressure created by the second blower 192 within the cap 160 overcomes the forces of convection and air travels downwardly in both the second passageway 130 and the first passageway 150. In this condition, the temperature of the generator 10 drops, since it is being bathed by cooler incoming air.

The outer housing 110 is supported by a support 244. Mounted within the support 244 is an infrared shield 180. The infrared shield 180 is positioned beneath the inner housing 120 and the opening 246 in the outer housing 110. Because the generator 10 operates at high temperature, a significant amount of infrared radiation emanates from the opening 246 in the base of the outer housing 110 and from the inner surface 122 of the inner housing 120. Allowing this radiation to escape would be a waste of energy and could create uncomfortable conditions in the environment, for example, if the device was mounted near a hospital bed. The infrared shield 180 is effective to reflect infrared radiation emanating from generator 10 back into opening 246. This process saves energy and makes the ambient environment more comfortable for the patient by keeping the heat within the device.

Similarly, as discussed above, the inner surface of the cap 160 is curved and coated with a reflective material to act as an infrared shield 182 to reflect infrared radiation emanating from the top of the generator 10.

Also mounted within the support 244 is a first blower 190. The first blower mixes a large amount of ambient cool air with warmer air escaping from opening 246 in the outer housing 110. This mixing dramatically lowers the temperature of the air escaping from opening 246.

Efficiently utilizing the heat generated by the generator 10 is a design goal for many of the features of the device. In addition to the infrared shield 180 already discussed, it is noteworthy that discharge tube 200 is fed back through the fourth outlet 240. The oxygen generated by generator 10 and discharged through discharge tube 200 is warm compared to the incoming air through second blower 192 and fourth inlet 240. As such, the cooler incoming air is warmed by the hot oxygen being discharged through discharge tube 200. This is effective in lowering the temperature of the oxygen for the patient's use as well as saving the energy present within the oxygen and transferring it to the incoming air.

Additionally, the interior of the inner and outer housing 120, 110 is insulated with alumino silicate which is shown at 121, 111. In the preferred embodiment, the insulation has a reflective backing which holds the fibers together, as well as contributing to the efficiency of the device by reflecting infrared radiation back into the passageways 130, 150, 230. The preferred insulation material is manufactured by the Carborundum Company under the trade name Fiberfrax ® HSA Systems.

Another important material related feature is the use of silver lead wires for electrical connections. Because the device operates at about 900° C., care must be taken to chose materials which will retain operational and dimensional stability at those temperatures. Silver melts at 961° C., and therefore can remain dimensionally stable at these operating temperatures. Another advantage is that silver will not oxidize. While gold and platinum will also work, silver is preferred for applications which operate at temperatures below its melting point because it is cheaper and is not subject to oxidation, as is platinum. Platinum, with a melting point of 1,769° C., is the preferred material at operating temperatures above the melting points of gold and silver.

Figure 1:
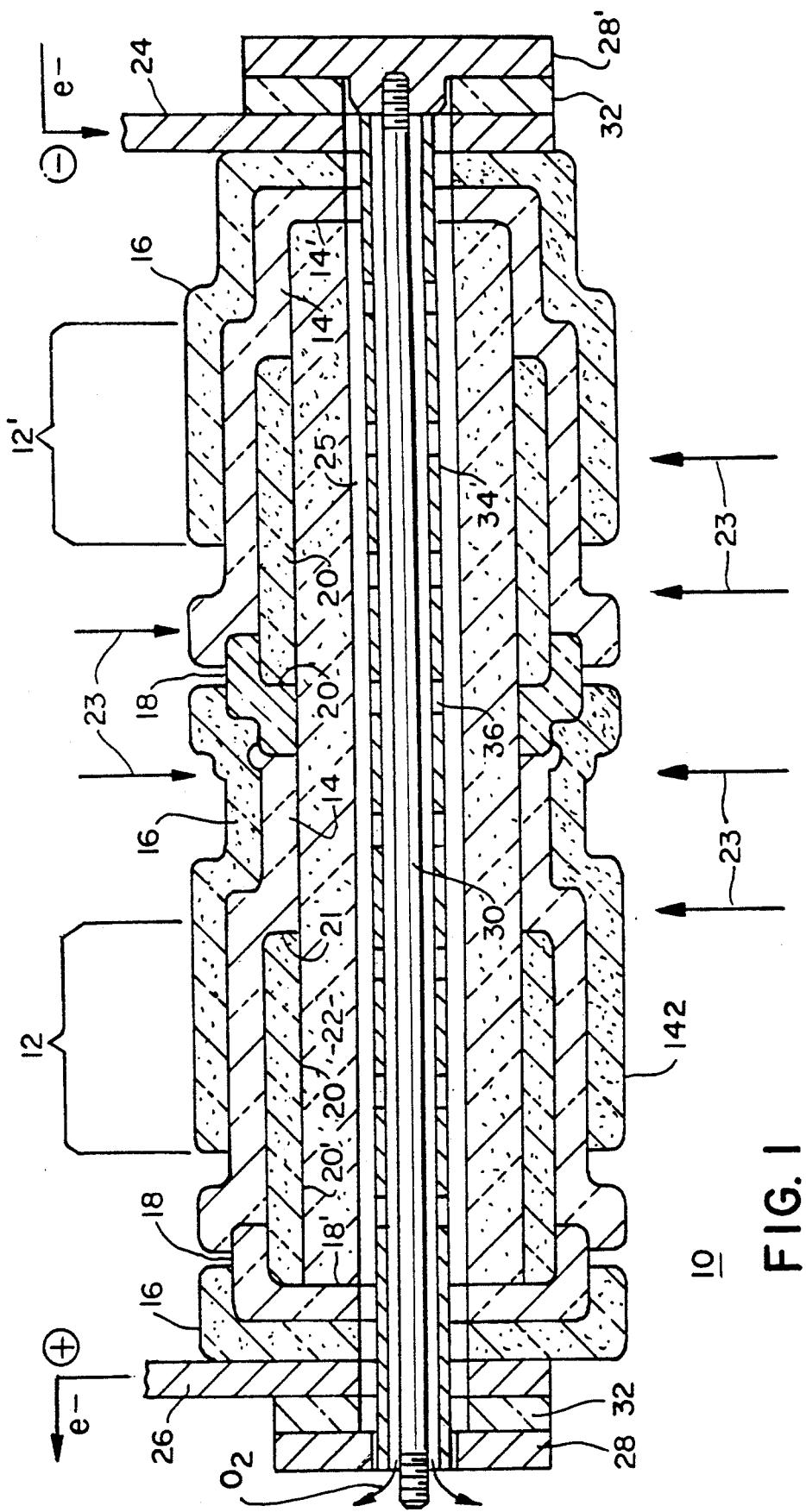
FIG. 1 is a plan view, partially in section, of one embodiment of a tubular, stepped, stacked, oxygen generator used in this invention, showing the cell configuration, end seal portions, power contacting connections, and source of air.

With reference to FIG. 1, the operation of the electrochemical oxygen generator 10 will now be explained. In this explanation, the term "tubular" is meant to include any axially elongated structural form having a closed cross-section. The term "air electrode" means that electrode which contacts ambient air on the outside of the generator and allows formation of oxygen ions from oxygen in the air. The term "oxygen electrode" means that electrode which allows formation of oxygen gas from oxygen ions and allows passage of the oxygen gas into the interior of the generator. The term "dense" means at least 95% of the theoretical density.

The generator is driven by a DC power source. It operates at from 650° C. to 1,100° C. with preheated air which can be unpressurized. The generator is able to extract pure oxygen at the electrolyte surface at a rate proportional to the electric current.

Referring now to FIG. 1 of the drawings, a high temperature electrochemical device 10 useful as an oxygen generator is shown, having a closed cross-section, preferred tubular form, and comprising a plurality of adjacent electrochemical cells, the active lengths of which are shown as first cell 12 and adjacent cell 12', arranged end to end. In the currently preferred embodiment, a single tubular oxygen generator is used. In other applications, such as some which require higher flow rates, a series of tubular oxygen generators can be placed within a single inner housing. In such cases, the currently preferred arrangement is a hexagonal array. The cells are electrically connected in series through continuous, spaced-apart solid oxide electrolyte bands or segments 14, continuous, spaced-apart air electrode band 16, continuous, spaced-apart interconnection segments 18, and continuous, spaced-apart oxygen electrode bands 20.

Optional, porous support 22, which is preferably from 20% to 40% porous (80% to 60% of theoretical density), and which is generally used, as shown, supports oxygen electrodes 20 and the rest of the structure. Dense, solid electrolyte 14 is disposed on top of part of the inner oxygen electrode 20 starting a predetermined length from a first end 20' of each oxygen electrode. Outer porous air electrode 16 is disposed on top of part of the electrolyte 14 and in contact with air 23 which surrounds the generator body 10.

Electrical Connection from cell to cell is made by a stacked configuration, where dense, preferably 100% dense, gas impervious, electronically conductive inner-connection 18 is deposited over and contacts part of the uncovered portion of support 22 next to the oxygen electrode 20 from cell 12' and overlaps a portion of that oxygen electrode. Dense, gas impervious, ionically conducting, solid electrolyte 14 from first cell 12 is deposited on top of the inner, oxygen electrode 20 from cell 12 continuing beyond the end 21 of the oxygen electrode and onto the remaining uncovered portion of support 22, overlapping inter-connection 18 next to cell 12' but not contacting the adjacent oxygen electrode band 20 of cell 12'. The combination of electrolyte and inner-connection closes off the porosity in the underlying support and oxygen electrode. Both electrolyte and inner-connection material are disposed between inner electrodes of adjacent cells, and this is essential in this design to prevent gas leakage.

In the embodiment shown in FIG. 1, the dense electrolyte 14 overlaps the dense inter-connection 18 between cells 12 and 12' and overlaps the dense inter-connection 18 near the positive terminal 26, which latter connection forms a dense end portion for that device. This overlapping produces a gas impermeable barrier between the outside and the inside of the device.

Air electrode 16 from cell 12 is deposited on top of the electrolyte 14 from cell 12 continuing until contacting the inter-connection 18 between cells 12 and 12'. To prevent electrical shorting between cells, a gap region is maintained between the air electrode 16 of cell 12, and the electrolyte 14 of cell 12'. These coatings of materials can be laid down by any suitable application masking techniques, such as electrochemical vapor deposition, sputtering, powder sintering, plasma arc spraying, and the like. Electrochemical vapor deposition is a preferred method of depositing electrolyte and inter-connection materials, and reference may be made to U.S. Pat. No. 4,609,562 (Isenberg, et al.) herein incorporated by reference for details on that process.

This generator device is capable of generating oxygen gas from air upon application of an electrical current. Electrons from a DC power source (not shown) are fed into a terminal 24 (negative terminal), preferably of round washer design having an extended bus bar contact area. The electrons pass through the air electrode 16 of cell 12', where oxygen in the air 23 which need not be pressurized, is reduced at the operating temperature of the generator, preferably 650° C. to 1,100° C., to provide oxygen ions $O^=$, which pass through the ionically conductive, electronically non-conducting (does not pass $e^-$) solid electrolyte 14. The oxygen ions recombine to form pure $O_2$ gas at the oxygen electrode 20 and pass through the porous support 22 into the central chamber 25. The reactions are:

I. Air electrode: $O_2(\text{in air}) + 4e^- \rightarrow 2(O^=)$
II. Oxygen electrode: $2(O^=) \rightarrow O_2 + 4e^-$
III. Overall cell: $O_2(\text{in air}) \rightarrow O_2$ As shown in FIG. 1, electrons released in the oxygen electrode 20 from cell 12', pass through inter-connection 18 between cell 12 and cell 12' into the air electrode 16 of cell 12, where identical electrode reactions occur, with electrons generated in the oxygen electrode 20 from cell 12 finally passing to terminal 26 (positive terminal) of similar design as terminal 24, through the adjacent interconnection 18 and air electrode 16, and back to the DC power supply.

Thus, the tubular segment of inter-connection material between cells provides electrical continuity (allows a flow of electrons) from the outer air electrode from a first cell 12' to the inner oxygen electrode of a second cell 12, on the same device or tube, in a series arrangement. Also, air 23 is prevented from directly passing into the central chamber 25 by a continuous, dense, preferably 100% dense, barrier of electrolyte bands or segments 14 and inter-connect segments 18. The dense electrolyte bands or segments, in part, overlap and seal to the dense inter-connection segments 18. This air impermeability of the generator body is essential to providing high purity $O_2$, i.e. over approximately 95% pure, in the central chamber. While length 12 and 12' define the "active" lengths of the two cells shown in FIG. 1 and in FIG. 2, electrode and electrolyte components shown extending out beyond the active length, are considered the active part from that particular cell. While the incoming air 23 does not have to be over atmospheric pressure, a great advantage in terms of the oxygen supply system, it may preheated consistent with the overall system design previously described prior to contact with the air electrodes 16 of the generator.

A variety of end closures or portions, preferably dense, can be used in the apparatus shown. In FIG. 1, the dense inter-connection portion 18', near the positive terminal, and the dense electrolyte portion 14', near the negative terminal, are overlapped at the ends of the device and disposed transverse to the axial length of the device, as shown, to provide end closures. A high temperature resistant metal, central, axial rod, tube or the like 30, of, for example, Inconel (nickel-chromium alloy), having threads at each end, can be use in conjunction with metal end sheets 28 and 28', to secure the sheets and the dense inter-connection and electrolyte portions in a compressed relationship. As shown, one end of the rod would be screwed into a mated thread, machined into the inner side of sheet 28', and the other end would be screwed down onto insulating rings 32 by an effective spring means (not shown), applying axial pressure to the end sheets, and assuring a gas tight fit against the flat metal terminals 24 and 26. In a preferred embodiment, the generator 10 is preheatable by placing a voltage differential at the opposite ends of the axial rod 30. In such embodiments, the rod 30 material is chosen to develop the desired heat at the desired current levels.

A suitable, high temperature resistant metal or ceramic tubular sleeve 34, having a plurality of vents or holes 36 therethrough, suitably sealed to end sheet 28, can provide oxygen delivery through the end closures 18', as shown by the $O_2$ arrows. Inconel and alumina would both be suitable as the sleeve 34. In some instances, it may be desirable to have oxygen delivery though both ends. Alternatively, an additional hole can be drilled through end closure 18', and air electrode 16, terminal 26 ceramic ring 32 and end sheet 28, and a tube inserted for oxygen delivery, similar to 38 in FIG. 2. This tube 38 can be made to cooperate with discharge tube 200 of FIGS. 3 and 4. The design of FIG. 1 utilizes a substantial amount of metal hardware in contact with ceramic components. There, positive and negative terminals contact air electrode material at each end of the device. The design of FIG. 2, while having more complicated terminal connections, can provide a primarily all-ceramic device, eliminating some possible problems of varying coefficients of thermal expansion between selected metals and ceramics.

Figure 2:
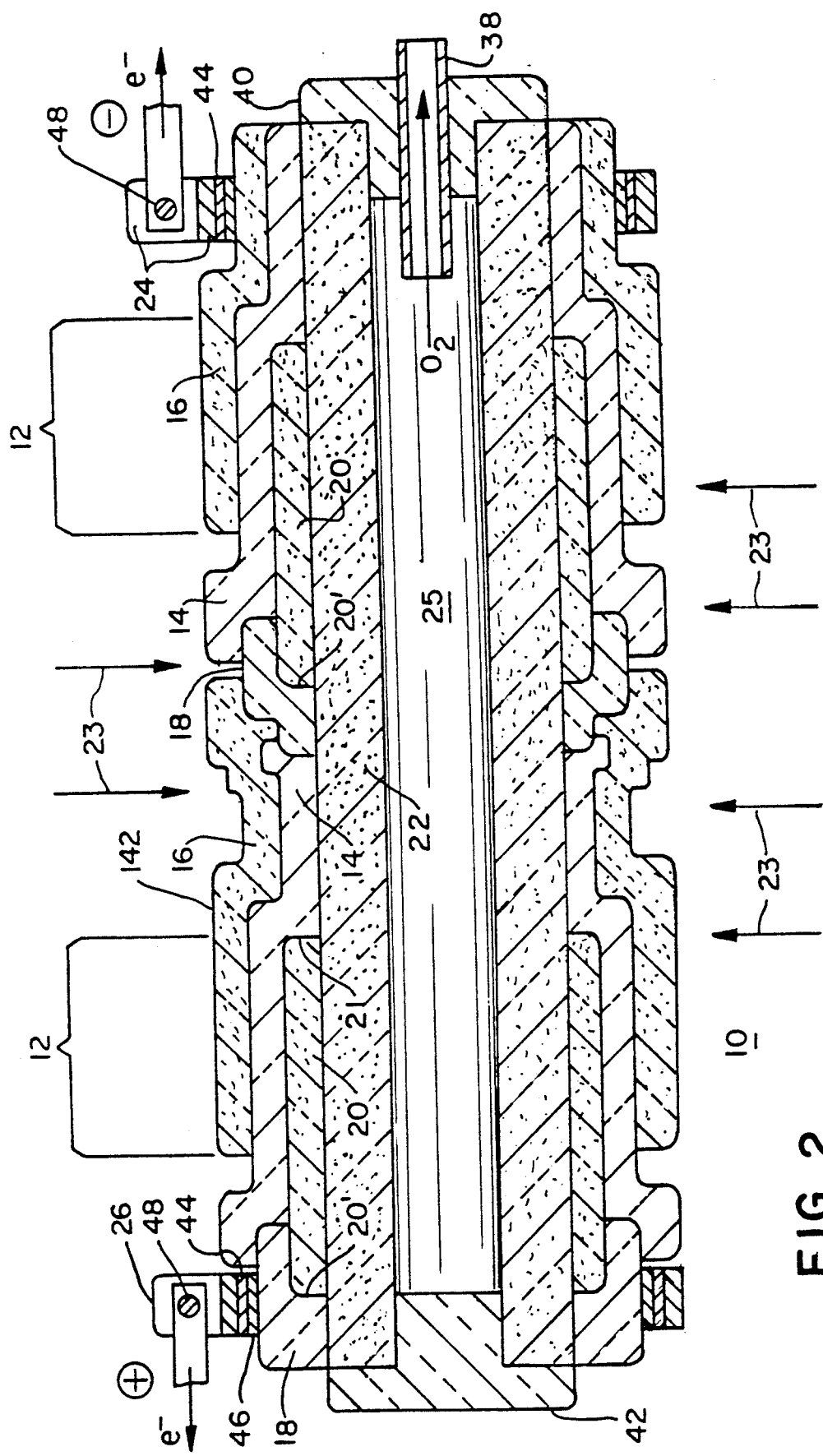
FIG. 2 shows another embodiment of the oxygen generator used in this invention, in plan view partially in section.

In FIG. 2, the cell structure and inter-connection between cells are essentially the same as the device of FIG. 1, utilizing the same materials and substantially the same cell connection design. However, ceramic end portions or caps 40 and 42 are used in place of the end overlapping inter-connection 18' and end overlapping electrolyte 14' design of FIG. 1. This use requires a sinter seal comprising very fine ceramic particles (not shown) between end portions or caps 40 and 42 and the ceramic support 22. The ceramic end portions are preferably dense, to the degree of being gas impervious, and are preferably of the same material as the support tube. Preferably, the ceramic support tube 22, in both embodiments, will be a zirconia material, such as stabilized zirconia, most preferably calcia-stabilized zirconia, for example $(ZrO_2)_{0.85}(CaO)_{0.15}$. This material, is pressed and highly densified form, is preferably also used as the ceramic end portions or caps 40 and 42 in FIG. 2.

Preferably, a seal (end portion or cap to support tube) is produced by squeezing in a preformulated paste of very fine particle size calcia stabilized zirconia into the gap region when the end portions or caps are inserted. The ceramic end seal assembly is then dried and sintered in place, to complete fabrication. The narrow gap of the joint, the long, tortuous path, and the near-ambient pressure during operation of the device will all contribute to minimize leakage of any air into the central chamber 25 so that high purity $O_2$ can be provided. A minor amount of sintering aid, such as FeO for example, can be used in the adhesive paste and can also be used in both the support tube and end caps. Other suitable ceramic materials can also be used for the support tube, and the end caps which overlap the end of support tube 22.

While the device of FIG. 1 relies primarily on a pressure seal between overlapping end inter-connection material 18', overlapping end electrolyte material 14', contacting metal terminals 24 or 26, ceramic spacers 32, and metal sheets 28 and 28', any useful high temperature adhesive can also be used between those components to assure minimal air permeation into central chamber 25.

The terminal connections on the device of FIG. 1 are of simple round washer design, having an extending bus bar contact area secured by pressure tightening rod 30, where the terminals 24 and 26 are preferably silver (m.p. 961° C.), but can also be platinum (m.p. 1,769), or palladium and alloys of palladium and platinum with silver, if the device is to be operated close to its 1,100° C. maximum operating temperature.

In the device of FIG. 2, terminal attachments are of circular band design, and directly electrically contact the top surface of the inter-connection material at one end and the air electrode material at the other end of the device, and require cushioning layers. The negative terminal 24 electrically contacts the air electrode 16, preferably through a fiber metal ring 44, preferably of silver-palladium fibers. A metallic split ring clamp constitutes the terminals 24 and 26, which are shown partly in section. The terminals 24 and 26 are preferably silver-palladium alloy, but can also be solid nickel, preferably coated with silver-palladium alloy. Terminal 26 in the FIG. 2 design electrically contact inter-connection material 18 and may require an additional fiber metal ring 46, preferably of silver-palladium. Also shown in FIG. 2 are bus bar, bolt, nut, lock washer assemblies 48. Oxygen gas from the central chamber 25 shown in FIG. 2 can be delivered through tube 38, which is preferably of a ceramic such as calcia-stabilized zirconia, or by any other appropriate means at one or both ends.

Useful and approximate, non-limiting dimensions for both oxygen generator device designs are porous support tube: 44 mm inside diameter, 50 mm outside diameter by 450 mm long; porous oxygen electrode: 15 mm long by 1 mm thick; dense interconnection: 0.05 mm to 2 mm thick; dense electrolyte: 11 mm long by 0.05 mm thick; and porous air electrode: 15 mm long by 0.1 mm thick. The unit would be a single stack, having a multiplicity of series-connected cells each about 1.1 cm long having an area of approximately 18 cm$^2$. For sake of simplicity, the drawings are not shown to scale.

Useful porous support tube materials, preferably from 4 mm to 10 mm thick, have been previously discussed, The oxygen electrode 20, preferably from 0.5 mm to 2 mm thick, is a 20% to 40% porous, sintered oxide material selected from doped and undoped oxides or mixtures of oxides in the pervoskite family, such as $CaMnO_3$, $LaNiO_3$, $LaCoO_3$, and preferably $LaMnO_3$, or other electronically conducting mixed oxides generally composed of rare earth oxides mixed with oxides of cobalt, nickel, copper, iron, chromium and manganese, and combinations of such oxides. Dopants when used are preferably selected from calcium, strontium, and magnesium, with strontium dopant preferred. The most preferred oxygen electrode is lanthanum manganite doped with strontium, for example $La_{0.9}Sr_{0.1}MnO_3$. The air electrode is preferably applied by dip slurry application and sintering.

The dense inter-connection material, 18, can be selected from the group consisting of platinum-zirconia, palladium-zirconia, silver-palladium-zirconia, palladium, platinum, palladium-silver, doped lanthanum manganite, and doped lanthanum chromite. The preferred inter-connection material is selected from the group consisting of doped lanthanum manganite, palladium, platinum, and palladium-silver. Dopants for the lanthanum manganite or lanthanum chromite are selected from the group consisting of calcium, strontium, and magnesium, with strontium dopant preferred. The most preferred inter-connection is doped lanthanum manganite. The inter-connection material is gas impervious and near 100% dense. It can be applied by well known vapor deposition techniques, and is usually from 0.05 mm to 2 mm thick. Densification can be achieved by a variety of techniques besides vapor deposition, including vapor sputtering, plasma spray, flame spray, and the like. In some cases, the inter-connection, oxygen electrode, and air electrode can be the same material differing only in density and application technique, with the inter-connection being the high density component.

The dense electrolyte 14, preferably from 0.02 mm to 0.15 mm thick, is a zirconia material, preferably at least 99% dense and most preferably 100% dense. The zirconia can be stabilized, that is, doped with a number of elements. Rare earth element stabilized zirconia, specifically yttria-stabilized zirconia is preferred, as it allows excellent oxygen ion mobility. A most preferred composition is $(ZrO_2)_{0.92}(Y_2O_3)_{0.08}$. Other mixed oxides can be used. The material must be effective to transfer ionic oxygen. It can be applied by chemical vapor deposition, plasma spray, flame spray, or sintering techniques.

The porous air electrode, 16, preferably from 0.05 mm to 2 mm thick, is a 20% to 60% porous material selected from metal-ceramic materials selected from the group consisting of platinum-zirconia, palladium-zirconia, and silver-palladium-zirconia, or a porous, sintered oxide selected from the group consisting of doped lanthanum manganite and doped lanthanum chromite where the preferred dopants are calcium, strontium, and magnesium, with strontium dopant preferred. Palladium-zirconia is the most preferred air electrode material. The air electrode must be effective to allow reduction of $O_2$ in the air to oxygen ions.

The number of cells needed to provide a required volume of $O_2$ gas from air can be calculated for a given gas temperature. For a unit delivering 3 liters/minute of oxygen, delivered at 25° C., having cells of 18 cm$^2$ area; for a driving current density of 2 A/cm$^2$ and a cell current of 36 A(2 A cm$^2 \times$ 18 cm$^2$); oxygen production per cell would be approximately 36 A/cell $\times$ 3.80 ml/A-min = 136.8 ml/min-cell. If a 3 liter/minute of $O_2$ at 25° C. are required, the number of cells needed would be 3000 ml $O_2$/min ÷ 136.8 ml $O_2$/min-cell = 22 cells/stack.

The device operates at 900° C. at a current density of 2 amperes/cm$^2$, with ambient, unpressurized air delivery to the device. The preferred embodiment oxygen generator 10 was manufactured by Westinghouse Electric Corporation.

The power dissipated as heat in the oxygen concentration system maintains the operating temperature. For example, in a system designed to deliver 3 liters/minute at 25° C. and atmospheric pressure, the power required to maintain 900° C. is about 500 watts. An oxygen concentration system sufficient to deliver this flow rate at these conditions would have 22 cells operating at 631 millivolts and 36 amperes/cell. The heat generated by such a system is 500 watts and the operating temperature will be maintained by the electrochemical production of oxygen.

One advantage to this oxygen generation system is its ability to generate oxygen at flow rates which are proportional to the electrical current supplied to the generator 10. For example, if a flow rate of 1 liter/minute is desired, the oxygen generation system requires only 12 amperes be supplied to the generator 10. The cell voltage is calculated by Ohms Law and will be 210 millivolts. The power dissipated in this case is only 55 watts. This is not enough heat to maintain the operating temperature and the generator 10 cannot operate correctly. The difference between the oxygen generation heat and the temperature maintenance heat must be made up by an additional heater.

One advantage of the preferred embodiment of the invention is the use of the Inconel closure rod 30 as a heat source. Electric current can be imposed on the rod 30 such that the rod dissipates the amount of heat required to maintain the operating temperature. The higher the oxygen flow rate, the lower the amount of heat required to be generated by the rod.

Another advantage of using the rod 30 to generate heat is the uniformity of the heating. High heating rates can be obtained upon the initial start up with the rod 30 centered inside the generator 10. Because the system is symmetrical about an axis, stresses developed due to uneven heating are minimized.

Another advantage of the rod 30 and the cylindrical layout of the oxygen concentration system is the efficient use of heat. For example, if the heater were to be located outside the generator 10, then a portion of the heat would be directed toward the generator 10 and the remainder would be dissipated away from the generator. Because the rod 30 passes through the center of the generator 10 substantially all of the heat generated by the rod 30 heats the generator 10.

Figure 5:
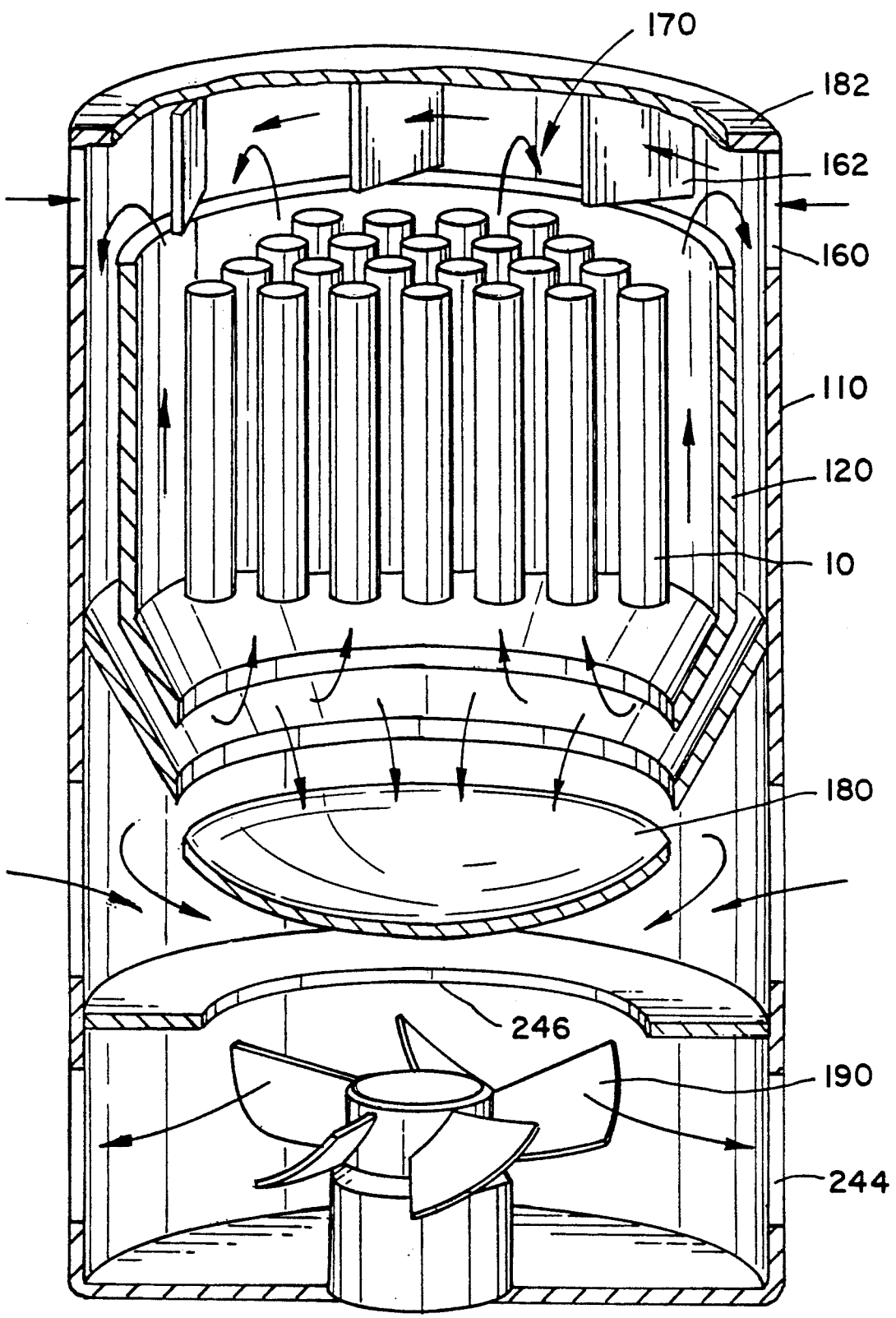

With reference to FIG. 5, an embodiment utilizing a plurality of tubular generators 10 is shown. In some applications, due to oxygen flow rate demands or geometric constraints, a plurality of generators 10 is a preferred configuration. When a plurality of generators 10 are used, a preferred configuration of the generators is in the form of a hexagonal array.

The number of generators 10 in each array are determined by the oxygen production requirements of the system and by the following mathematical formula:

$$X = 1 + \sum_{n=1} 6(n-1)$$

where
X = total number of generators in array
N = number of generators along a radius of the array
A series of numbers which are solutions to the above equation are:

1, 7, 19, 37, 61, 91, 127, 169, 217, 271, . . .

For example, in array featuring nineteen tubular generators 10, the array would feature a single generator 10 in the center, surrounded by six generators 10, which in turn are surrounded by twelve generators 10. In the embodiments shown in FIG. 5, N=4 and thirty-seven generators 10 are in the array.

The hexagonal configuration of the array is advantageous for minimizing the volume necessary to accommodate a certain number of generators 10. The hexagonal shape permits a large number of generators 10 to be put into a small volume.

For example, the following chart shows how the hexagonal arrangement of the generators 10 allows for greatly increased oxygen production without a proportionate increase in volume required.

generator 10, the number of generators can be adjusted to fit within the hexagonal array as described above.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An oxygen concentration system for producing oxygen from oxygen-containing gases and mixtures of gases, said system comprising:
   an electromechanical oxygen generator, said generator having an outer surface and means for extracting oxygen from the gases by an electromechanical reaction; and,
   an inner housing, said inner housing having inner, outer, base, and top surfaces, said generator mounted within said inner housing so that a first passageway is created between said inner surface of said inner housing and an outer surface of said generator, said first passageway having a first inlet near said base surface of said inner housing and having a first outlet near said top surface of said inner housing, said first passageway passing the gases entering said first inlet to said first outlet, the gases exiting said first passageway being in a heat-exchanging relationship with the gases entering said first inlet.

2. The oxygen concentration system of claim 1 wherein the gases adjacent said outer surface of said generator travel along said outer surface of said genera-

| Generator Diameter = | 2 inches | No. Cells = | 53 |
| Generator Voltage = | 37 volts | Cell Length = | 0.7 inches |
| Generator Current = | 36 amps | Cell Area = | 2.8 sq. in. |
| Generator Length = | 39 inches | | |
| System Height = | 60 inches | | |

| No. of Generators | Oxygen Delivery (1 pm@RTP) | System Diameter (inches) | System Volume (cu. ft.) | System Weight (lbs) | Power Required (kW) | Power Required (hp) |
| --- | --- | --- | --- | --- | --- | --- |
| 1 | 7 | 8 | 2 | 41 | 1 | 2 |
| 7 | 50 | 11 | 3 | 56 | 9 | 12 |
| 19 | 137 | 16 | 7 | 139 | 25 | 34 |
| 37 | 268 | 21 | 12 | 263 | 49 | 66 |
| 61 | 442 | 26 | 18 | 628 | 81 | 109 |
| 91 | 659 | 31 | 26 | 628 | 121 | 163 |
| 127 | 921 | 36 | 35 | 870 | 170 | 227 |

The hexagonal configuration also aids in retaining heat within the inner housing 120. Finally, the configuration provides for uniform heating of the generators 10 within the inner housing 120 via radiation.

The determination of the number of generators 10 necessary for a specific oxygen generation system requires an initial evaluation of the volume available for the generators 10.

When a range of acceptable generator lengths is determined, the area of generators 10 can be determined by knowing the surface areas of individual cells within the generator 10. In the preferred embodiment, each cell had an area of 18 cm$^2$, a driving current density of 2 A cm$^2$, and a cell current of 36 A. The oxygen production would be (36 A/cell) 3.80 ml/A-min) = 136.8 ml O$_2$/min-cell. Multiplying this number by the number of cells per generator 10 yields the oxygen production of each generator 10. By adjusting the number of cells per tor in a direction parallel to a longitudinal axis of said generator.

3. The oxygen concentration system of claim 1 wherein said generator is an elongated tubular member, said generator mounted vertically within said inner housing.

4. The oxygen concentration system of claim 1 wherein said outer surface of said generator and said inner surface of said inner housing are cylindrical.

5. The oxygen concentration system of claim 4 wherein said outer surface of said generator is concentrically centered within said inner surface of said inner housing.

6. The oxygen concentration system of claim 1 further comprising:
   insulation between said inner surface and said outer surface of said inner housing.

7. The oxygen concentration system of claim 1 further comprising:
insulation between said inner surface and said outer surface of said inner housing, said insulation being made of alumino silicate.

8. The oxygen concentration system of claim 1 further comprising:
a first blower, said first blower mounted near said base surface of said inner housing, said blower dissipating the gases exiting said inner housing.

9. The oxygen concentration system of claim 1 wherein the width of said first passageway is between 0.5 inches and 4 inches.

10. The oxygen concentration system of claim 1 wherein the volume of said first passageway is between 150 and 350 cubic inches.

11. The oxygen concentration system of claim 1 wherein the rate of oxygen production of said generator is less than or equal to 10 liters/minute.

12. An oxygen concentration system for producing oxygen from oxygen-containing gases and mixtures of gases, said system comprising:
an electromechanical oxygen generator, said generator having an outer surface and means for extracting oxygen from the gases by an electrochemical reaction;
an inner housing, said inner housing having inner, outer, base, and top surfaces, said generator mounted within said inner housing so that a first passageway is created between said inner surface of said inner housing and an outer surface of said generator, said first passageway having a first inlet near said base surface of said inner housing and having a first outlet near said top surface of said inner housing, said first passageway passing the gases entering said first inlet to said first outlet; and,
an outer housing, said outer housing having inner, outer, base, and top surfaces, said inner housing being mounted within said outer housing so that a second passageway is created between said inner surface of said outer housing and said outer surface of said inner housing.

13. The oxygen concentration system of claim 12 further comprising:
a second inlet, said second inlet being near said top surface said outer housing; and,
a second outlet, said second outlet being near said base surface of said outer housing, said second outlet cooperatively associated with said first inlet of said inner housing so that the gases exiting said outer housing enter said first inlet of said first passageway.

14. The oxygen concentration system of claim 12 wherein the gases in said second passageway of said outer housing travel in an opposite direction to the the gases travelling in said first passageway in said inner housing.

15. The oxygen concentration system of claim 12 wherein the gases in said second passageway of said outer housing travel downwardly.

16. The oxygen concentration system of claim 12 wherein said inner surface of said outer housing angles inwardly, said angling effective to direct the gases from second passageway to said first inlet of said first passageway.

17. The oxygen concentration system of claim 12 further comprising:
a second inlet, said second inlet being near said top surface of said outer housing;
a second outlet, said second outlet being near said base surface of said outer housing; and,
a transition passageway, a centerline of said transition passageway intersecting a centerline of said second passageway at an obtuse angle, said transition passageway having a third inlet and a third outlet, said third inlet of said transition passageway cooperating with said second outlet of said second passageway and said third outlet of said transition passageway cooperating with said first inlet of said first passageway so that the gases exiting said second passageway enter said transition passageway.

18. The oxygen concentration system of claim 12 further comprising:
insulation between said inner surface and said outer surface of said outer housing.

19. The oxygen concentration system of claim 12 further comprising:
insulation between said inner surface and said outer surface of said outer housing, said insulation being made of alumino silicate.

20. The oxygen concentration system of claim 12 wherein said inner housing and said outer housing are concentric cylinders.

21. The oxygen concentration system of claim 12 wherein the width of said second passageway is between 0.5 inches and 4 inches.

22. The oxygen concentration system of claim 12, wherein the volume of said second passageway is between 650 and 800 cubic inches.

23. The oxygen concentration system of claim 12 wherein the ratio of the volume of said second passageway to the volume of said first passageway is between 2:1 and 4:1.

24. The oxygen concentration system of claim 12 wherein the ratio of the height of the first passageway to the width of the first passageway is between 10:1 and 15:1.

25. The oxygen concentration system of claim 12 wherein the ratio of the height of the second passageway to the width of the second passageway is between 10:1 and 15:1.

26. The oxygen concentration system of claim 12 wherein the gases in said second passageway of said outer housing travel in the same direction as the gases traveling in said first passageway of said inner housing.

27. An oxygen concentration system for producing oxygen from oxygen-containing gases and mixtures of gases, said system comprising:
an electrochemical oxygen generator, said generator having an outer surface and means for extracting oxygen from the gases by an electrochemical reaction;
an inner housing, said inner housing having inner, outer, based, and top surfaces, said generator mounted within said inner housing so that a first passageway is created between said inner surface of said inner housing and an outer surface of said generator, said first passageway having a first inlet near said base surface of said inner housing and having a first outlet near said top surface of said inner housing, said first passageway passing the gases entering said first inlet to said first outlet by means of conviction; and,
a reflective shield, said shield made of a material suitable to reflect infrared radiation emanating from said inner housing back into said inner housing, said shield mounted below said inner housing.

28. An oxygen concentration system for producing oxygen from oxygen-containing gases and mixtures of gases, said system comprising:

an electrochemical oxygen generator, said generator having an outer surface and means for extracting oxygen from the gases by an electrochemical reaction;

an inner housing, said inner housing having inner, outer, based, and top surfaces, said generator mounted within said inner housing so that a first passageway is created between said inner surface of said inner housing and an outer surface of said generator, said first passageway having a first inlet near said base surface of said inner housing and having a first outlet near said top surface of said inner housing, said first passageway passing the gases entering said first inlet to said first outlet by means of convection; and, a reflective shield, said shield suitable to reflect infrared radiation emanating from said inner housing back into said inner housing, said shield mounted above said inner housing.

29. An oxygen concentration system for producing oxygen from oxygen-containing gases and mixtures of gases, said system comprising:

an electrochemical oxygen generator, said generator having an outer surface and means for extracting oxygen from the gases by an electrochemical reaction;

an inner housing, said inner housing having inner, outer, base, and top surfaces, said generator mounted within said inner housing so that a first passageway is created between said inner surface of said inner housing and an outer surface of said generator, said first passageway having a first inlet near said base surface of said inner housing and having a first outlet near said top surface of said inner housing, said first passageway passing the gases entering said first inlet to said first outlet by means of convection;

an outer housing, said outer housing having inner, outer, base, and top surfaces, said inner housing being mounted within said outer housing so that a second passageway is created between said inner surface of said outer housing and said outer surface of said inner housing; and, a cap, said cap having an interior and an exterior surface, said cap attached to said top surface of said outer housing, said cap having a fourth inlet.

30. The oxygen concentration system of claim 29 wherein said cap is adapted to create a first mixing zone, said first mixing zone adapted to receive the gases entering said fourth inlet of said cap and the gases exiting said first outlet of said first passageway.

31. The oxygen concentration system of claim 30 wherein said mixing zone is adapted for the transfer of heat from the gases exiting said first outlet of said first passageway to the gases entering said fourth inlet of said cap.

32. The oxygen concentration system of claim 29 further comprising:

a fin, said fin attached to said interior surface of said cap, said fin oriented to direct the gases entering said fourth inlet of said cap into said second inlet of said second passageway.

33. The oxygen concentration system of claim 27 further comprising:

a fin, said fin attached to said interior surface of said cap, said fin oriented to direct the gases entering said fourth inlet into a circular pattern within said cap so that a vortex is created.

34. The oxygen concentration system of claim 29 wherein the interior surface of said cap is made of a reflective material suitable to reflect infrared radiation back into said inner housing.

35. The oxygen concentration system of claim 29 further comprising:

a second blower, said second blower mounted on said exterior surface of said oxygen concentration system, said second blower effective to tangentially blow the gases into said fourth inlet of said outer housing.

36. An apparatus for extracting oxygen from oxygen-containing gases and mixtures of gases, said apparatus comprising:

an outer cylinder, said outer cylinder having an inner and outer surface;

an inner cylinder fitting concentrically within said outer cylinder, said inner cylinder having an inner and outer surface, said outer surface of said inner cylinder being spaced from said inner surface of said outer cylinder, said spacing creating an outer gap between said outer and inner cylinders; and, tubular oxygen extraction means, said extraction means fitting concentrically within said inner cylinder so that an inner gap is formed between said inner cylinder and said extraction means, said extraction means generating heat via the application of electric current.

37. The apparatus of claim 36 further comprising:

heat transfer means for transferring heat from the gases exiting said inner gap to the gases entering said apparatus.

38. A method for extracting oxygen from oxygen-containing gases and mixtures of gases, said method comprising the steps of:

energizing an electrochemical generator, said generator for generating oxygen from the gases upon the application of an electric current;

confining said generating within an enclosed first housing so that a relatively narrow first gap is created between said first housing and said generator;

heating the the gases in said first gap; and, upwardly transporting the gases in said first gap by placing the gases heated in said first gap in heat-exchanging relationship with gases entering said first gap.

39. A method for extracting oxygen from oxygen-containing gases and mixtures of gases as in claim 38, wherein the heating is accomplished by means of said electrochemical generator.

40. A method for extracting oxygen from the oxygen-containing gases and mixtures of gases, said method comprising the steps of:

energizing an electrochemical generator, said generator for generating oxygen from the gases upon the application of an electric current;

confining said generator within an enclosed first housing so that a relatively narrow first gap is created between said first housing and said generator;

confining said generator and said first housing in an enclosed second housing so that a relatively narrow second gap is created between said second housing and said first housing, said second gap being operatively connected to the base of said first gap;
introducing cooler gases into said second gap;
heating the gases in said first gap; and,
upwardly transporting the gases in said first gap by means of convection.

41. A method for extracting oxygen from oxygen-containing gases and mixtures of gases as in claim 40, wherein the cooler gases are introduced in a circular fashion, thereby creating a zone of lower pressure above said first gap.

42. A method of moving oxygen-containing gases and mixtures of gases past a cylindrical electrochemical oxygen generator, said generator mounted concentrically within a cylindrical first housing so that a first passageway is formed between the generator and the first housing, said method of moving oxygen-containing gases and mixtures of gases comprising:
heating the gases in said first passageway;
introducing cooler gases above the gases in said first passageway; and,
moving the gases in said first passageway by means of convection.

43. A method of moving oxygen-containing gases and mixtures of gases past a cylindrical electrochemical oxygen generator as in claim 42 wherein the cooler gases are introduced in a circular fashion so as to create a vortex above said first air passageway.

44. A method of moving oxygen-containing gases and mixtures of gases past a cylindrical electrochemical oxygen generator as in claim 43 wherein the vortex creates a zone of lower pressure above said first passageway, said lower pressure effective to draw upwardly the gases in said first air passageway.

45. A method of moving oxygen-containing gases and mixtures of gases past a cylindrical electrochemical oxygen generator as in claim 43 wherein the cooler gases are directed in a circular fashion by means of fins.

46. A method of moving oxygen-containing gases and mixtures of gases past a cylindrical electrochemical oxygen generator as in claim 42 wherein the heating of the gases in the first passageway is by means of supplying an electric current to said generator.

47. A method of moving oxygen-containing gases and mixtures of gases past a cylindrical electrochemical oxygen generator as in claim 42 wherein said introduction of cooler gases is by means of a blower.

48. A method of moving oxygen-containing gases and mixtures of gases past a cylindrical electrochemical oxygen generator, said generator mounted concentrically within a cylindrical first housing so that a first passageway is formed between said generator and said first housing, said first housing mounted concentrically within a cylindrical second housing so that a second passageway is formed between said first housing and said second housing, said second passageway being connected to a base of said first air passageway, a cap mounted on said second housing so that a mixing zone is formed above said first and second air passageways, said method of moving the gases comprising the steps of:
heating the gases in said first passageway;
introducing cooler gases into said mixing zone in a circular fashion to create a vortex, said vortex creating a zone of low pressure above said first passageway; and,
directing the cooler gases downwardly into said second passageway, the cooler gases effective to displace warmer gases at said base of said first passageway.

49. A method of moving oxygen-containing gases and mixtures of gases past a cylindrical electrochemical oxygen generator as in claim 47 wherein the gases in said first passageway move in response to:
an upward pull due to said zone of low pressure above said first air passageway;
an upward push due to the displacement of warmer gases near said base of said first air passageway by cooler gases exiting said second air passageway; and,
upward movement due to convection as the gases within said first air passageway are heated by said generator.

50. A method of controlling the temperature within an oxygen concentration system, said system comprising an electrochemical oxygen generator mounted within inner and outer housings and a blower, said method comprising:
energizing said electrochemical generator, said generator capable of generating oxygen from oxygen-containing gases and mixtures of gases upon application of an electric current;
confining said generating within said inner housing so that a relatively narrow first gap is created between said inner housing and said generator, and a relatively narrow second gap is created between said first housing and said second housing;
energizing said blower so that gases are introduced within said cap; and,
adjusting the flow rate of said blower until the positive pressure within said cap is great enough to overcome and reverse the forces of convection within said first gap.

51. A method of raising the temperature of oxygen-containing gases and mixtures of gases within an oxygen concentration system, said system comprising an electrochemical oxygen generator mounted within inner and outer housings and a blower, said method comprising the steps of:
energizing said electrochemical generator, said generator for generating oxygen from the gases upon application of an electric current;
confining said generator within said inner housing so that a relatively narrow first gap is created between said inner housing and said generator, and a relatively narrow second gap is created between said first housing and said second housing;
energizing said blower so that the gases are introduced within said cap; and,
adjusting the flow rate of said blower until the positive pressure within said cap is great enough to equalize forces of convection within said first gap, thereby causing air flow within said first gap to substantially cease.

52. An oxygen concentration system as in claim 1 further comprising:
heating means for heating the interior of said generator, the heating means being a rod extending axially within said generator.

53. An oxygen concentration system as in claim 52 wherein said rod is heated by means of an electric current.

54. An oxygen concentration system as in claim 52 wherein said rod has a first and second end, each end being threaded and adapted to receive an associated closure member, said closure member holding said generator together.

55. The oxygen concentration system of claim 1 further comprising a plurality of generators arranged in a hexagonal array.

56. The oxygen concentration system of claim 55 wherein the number of generators is a number of the series:

$$1, 7, 19, 37, 61, 91, 127, 169 \ldots 1 + \Sigma 6(n-1)$$

where n = the number of generators in the array.

* * * * *